(12) United States Patent
Laue

(10) Patent No.: US 8,490,921 B2
(45) Date of Patent: Jul. 23, 2013

(54) LINE SYSTEM ARRANGEMENT IN AN AIRCRAFT OR SPACECRAFT HAVING A FUSELAGE

(75) Inventor: Hans-Georg Laue, Weyhe (DE)

(73) Assignee: Airbus Operations GmbH, Hamburg (DE)

( * ) Notice: Subject to any disclaimer, the term of this patent is extended or adjusted under 35 U.S.C. 154(b) by 859 days.

(21) Appl. No.: 12/300,506

(22) PCT Filed: May 30, 2007

(86) PCT No.: PCT/EP2007/055267
§ 371 (c)(1),
(2), (4) Date: Dec. 15, 2008

(87) PCT Pub. No.: WO2007/138082
PCT Pub. Date: Dec. 6, 2007

(65) Prior Publication Data
US 2009/0152399 A1   Jun. 18, 2009

Related U.S. Application Data

(60) Provisional application No. 60/809,562, filed on May 31, 2006.

(30) Foreign Application Priority Data

May 31, 2006   (DE) .......................... 10 2006 025 388

(51) Int. Cl.
*B64C 1/00* (2006.01)

(52) U.S. Cl.
USPC .......................... 244/119; 244/129.1; 244/132

(58) Field of Classification Search
USPC ................ 244/119, 129.1, 129.4, 129.5, 130, 244/131, 132, 158.1, 159.4
See application file for complete search history.

(56) References Cited

U.S. PATENT DOCUMENTS

| 2,549,110 A | * | 4/1951 | Michael | 244/129.4 |
| 2,965,336 A | * | 12/1960 | Lissarrague | 244/129.5 |

(Continued)

FOREIGN PATENT DOCUMENTS

| EP | 0980822 | 2/2000 |
| EP | 1140625 | 9/2005 |

(Continued)

OTHER PUBLICATIONS

Office Action from the Russian Agency for Patent and Trademarks in the parallel Russian application 2008145657/11.

*Primary Examiner* — Joseph W Sanderson
(74) *Attorney, Agent, or Firm* — Greer, Burns & Crain Ltd.

(57) ABSTRACT

A line system arrangement in an aircraft or spacecraft having a fuselage includes at least one receiving region for receiving at least one component of a line system, wherein the at least one receiving region is accessible, at least in some sections, from outside the fuselage of the aircraft and spacecraft for installation and/or maintenance of the line system; and an aircraft or spacecraft with a corresponding arrangement.

16 Claims, 4 Drawing Sheets

U.S. PATENT DOCUMENTS

| | | | |
|---|---|---|---|
| 2,976,806 A * | 3/1961 | Risk et al. | 361/732 |
| 3,405,893 A | 10/1968 | Flamand et al. | |
| 4,674,712 A | 6/1987 | Whitener et al. | |
| 5,040,611 A * | 8/1991 | Steel | 169/62 |
| 5,542,626 A | 8/1996 | Beuck et al. | |
| 5,816,539 A * | 10/1998 | Chan et al. | 244/159.4 |
| 6,536,710 B1 * | 3/2003 | Bobzien et al. | 244/119 |
| 2001/0030261 A1 * | 10/2001 | Bourgon et al. | 244/119 |
| 2005/0115565 A1 * | 6/2005 | Geary | 128/205.11 |
| 2005/0166983 A1 | 8/2005 | Shaw et al. | |

FOREIGN PATENT DOCUMENTS

| | | |
|---|---|---|
| FR | 2859975 | 3/2005 |
| GB | 641633 | 8/1950 |
| RU | 2 093 729 | 10/1997 |
| RU | 2093729 | 10/1997 |
| WO | WO2005/012083 | 2/2005 |

\* cited by examiner

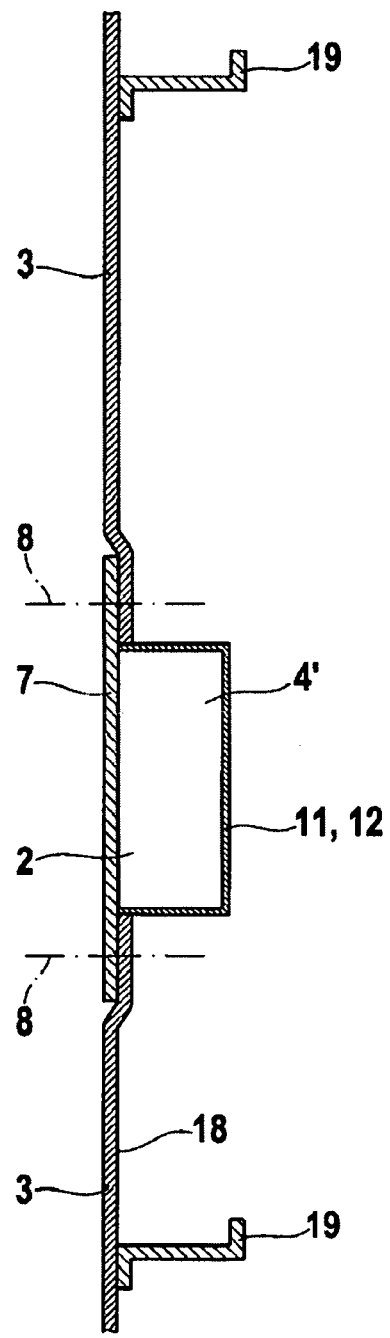

LINE SYSTEM ARRANGEMENT IN AN AIRCRAFT OR SPACECRAFT HAVING A FUSELAGE

FIELD OF THE INVENTION

The present invention relates to a line system arrangement in an aircraft or spacecraft having a fuselage, with at least one receiving region for receiving at least one component of a line system, and to an aircraft or spacecraft with an arrangement of this type.

BACKGROUND OF THE INVENTION

During the final assembly of an aircraft, a great deal of work is to be carried out within the fuselage, such as, for example, installation of various types of line systems.

Line systems of this type and their installation are also referred to as routings and generally comprise lines for liquid and gaseous media, for example water, air, oxygen, etc., and electric signal transmission lines, electric supply lines and potential equalization lines or the like. Fastenings and supporting elements and the like also belong to the components of the line systems.

It is customary to lay these line systems within the fuselage in the region subjected to an internal pressure. This also includes the installation of the line systems together with connections of the same to equipment and loads, for example in a hold, in a passenger cabin, or in the top region, the "crown area" of the fuselage.

In this connection, however, there is the problem that space within the fuselage is limited and it is not possible to carry out all work at the same time, which is disadvantageous in terms of economic efficiency. Furthermore, it is problematic that the line systems can be premanufactured only to a small extent.

SUMMARY OF THE INVENTION

Against this background, it is one of the objects of the pre-sent invention to provide an improved arrangement of a line system in a fuselage of an aircraft or spacecraft, which arrangement no longer has or very largely eliminates the above-mentioned disadvantages and which, in particular, reduces the installation work within the fuselage.

Accordingly, a line system arrangement in an aircraft or spacecraft having a fuselage includes at least one receiving region for receiving at least one component of a line system, wherein the at least one receiving region is accessible, at least in some sections, from outside the fuselage of the aircraft or spacecraft for installation and/or maintenance of the line system, and wherein the at least one receiving region is adapted to an internal pressure which corresponds to a particular external pressure of the fuselage.

In comparison to the approaches mentioned at the beginning, the present invention therefore may achieve the advantage that the line systems can be fitted from the outside into receiving regions provided for them, with, during the installation, the interior space being kept free for other work. Furthermore, there may be a considerable advantage in that the line systems can be predominantly premanufactured separately, as a result of which the fitting time is additionally advantageously reduced. The effect achieved by the invention may be that a time saving during assembly is advantageously increased by approximately 60%.

Furthermore, an aircraft or spacecraft may be provided with at least one receiving region for receiving at least one component of a line system, wherein the at least one receiving region is accessible, at least in some sections, from outside the fuselage of the aircraft and spacecraft for installation and/or maintenance of the line system.

In one particular embodiment, it is provided that the at least one receiving region extends along an inner wall of the fuselage in a longitudinal direction of the fuselage or at an angle to the longitudinal direction. This results in regions for which premanufacturing or preassembly of the line systems is advantageously suitable, and produces an additional time saving.

In this case, the arrangement may include a pressure-tight separating device for pressure-tight separation of the at least one receiving region from an interior space of the fuselage. This affords the advantage that the receiving regions, which are accessible from the outside, can be closed by coverings which can be removed again, without a special pressure-tight encapsulation having to take place after installation or again during maintenance.

For this purpose, the at least one receiving region may have a closable opening as access region. This closable outer wall section may be designed as a section of an outer wall of the fuselage with a contour matched to said outer wall.

In a further embodiment, it is provided that the at least one removable outer wall section is designed to absorb and/or pass on forces occurring in the fuselage. For this purpose, said outer wall section can be attached removably by means of fastening elements, such as, for example, screws. In general, the line system components, which are installed in the receiving regions, are not frequently exchanged and therefore only have to be checked at certain maintenance intervals.

A particular advantage may reside in the fact that the at least one receiving region is arranged outside an impact region of the fuselage. The probability that, even in the event of an impact, systems will continue to maintain their function is therefore increased.

The invention is explained in more detail below with reference to the exemplary embodiments which are illustrated in the schematic figures of the drawing, in which:

BRIEF DESCRIPTION OF THE DRAWINGS

FIG. 4 shows a sectional view along the section line A-A from FIG. 3.

In the figures, the same reference numbers refer to identical or functionally identical components unless otherwise stated.

DETAILED DESCRIPTION OF THE INVENTION

Figure 1:
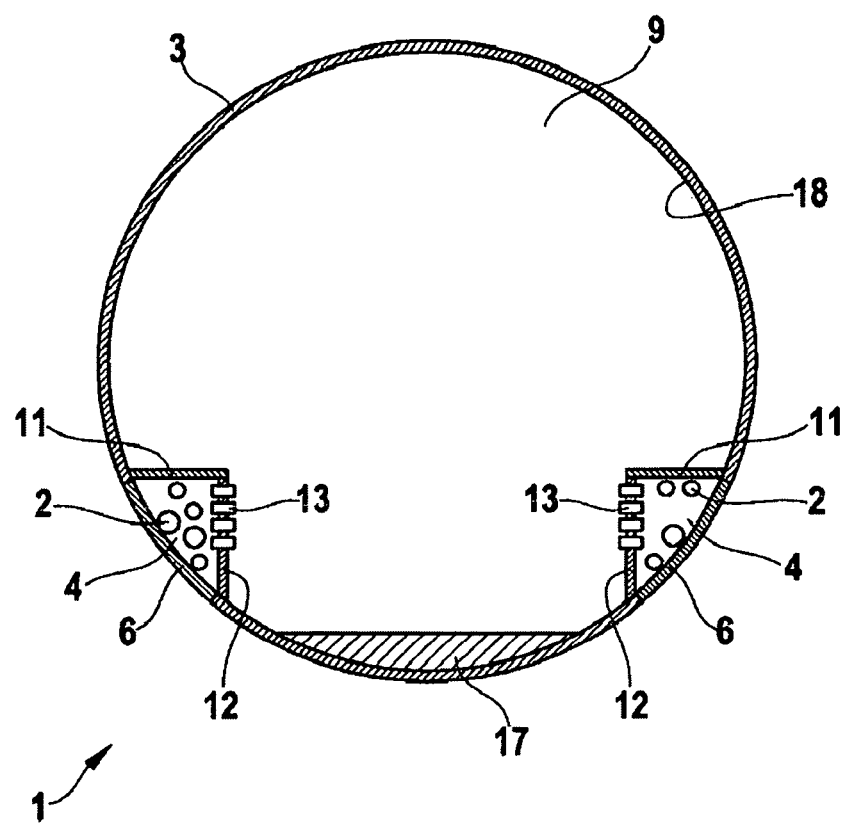
FIG. 1 shows a cross-sectional view of a fuselage with a line system arrangement according to an exemplary embodiment of the present invention.

FIG. 1 shows a cross-sectional view of a fuselage 3 of a line system arrangement 1 according to an exemplary embodiment of the present invention.

In this example, the fuselage 3 has a circular cross section and is a fuselage of an aircraft which is not shown specifically. The fuselage 3 encloses a first interior space 9 which is enclosed in a pressure-tight manner by an inner wall 18 of the fuselage 3. An "impact region" 17, which is also referred to as a crash area, is arranged in the lower region of the fuselage 3. In this example, above the impact region 17 on each side of the fuselage 3 there is arranged a receiving region 4 which is separated in a pressure-tight manner from the first interior space 9 by means of a respective first separating device 11 and second separating device 12. The separating devices 11, 12 therefore form a continuation of the pressure-tight encapsulation of the interior space 9 by the inner wall 18. The cross section of the receiving regions 4 is, for example, triangular, with the respective outer wall section 6 having a curvature.

A line system 2 with at least some of its components is arranged within each receiving region 4. Said components are, in particular, lines, for example for liquid and gaseous substances, such as oxygen and water, lines for electric signals and electrical power, lines for transmitting and conducting said media from a source including a power supply unit to one or more consumers, and vice versa. They also include, for example, lines of air-conditioning systems and electric potential equalization bus bars. The components can also contain the various supporting and fastening elements for the lines.

Connections to loads, such as, for example, illumination, switches, communication systems and the like, are realized, for example, via first connecting devices 13 which are advantageously placed in the separating devices 11, 12 in such a manner that the pressure-tight construction thereof is not impaired. For this purpose, these connecting devices 13, for their part, can be designed to be pressure-tight.

Figure 2:
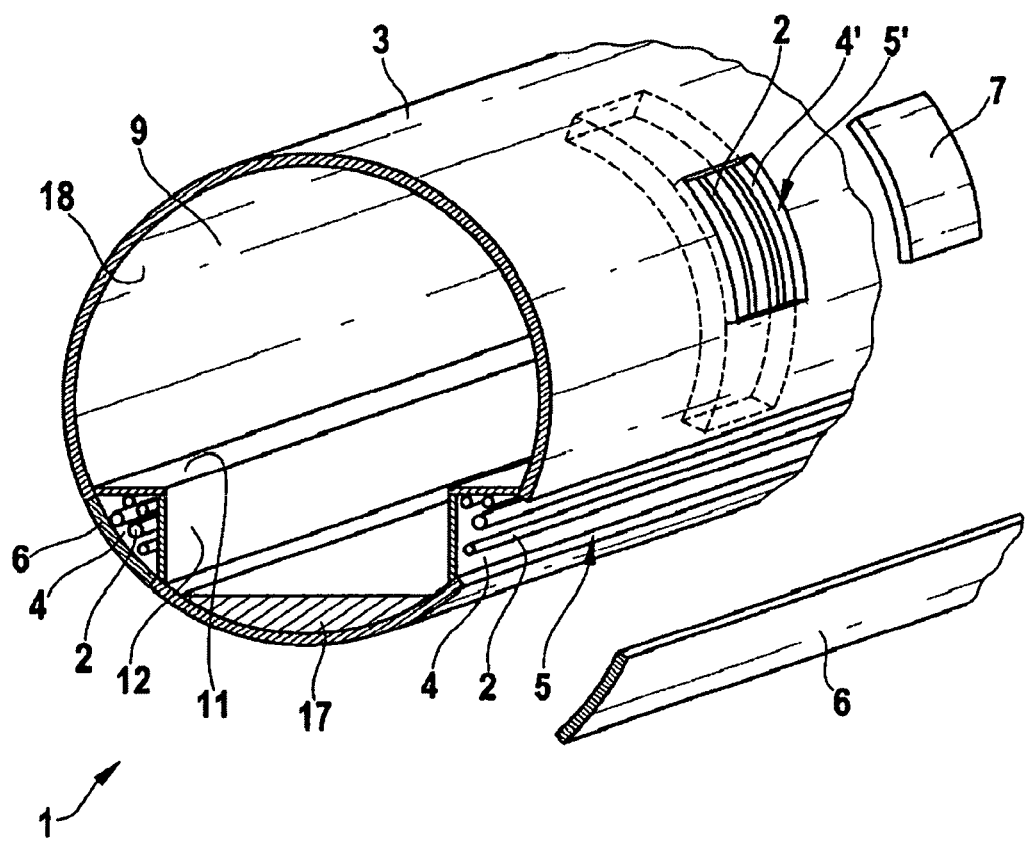
FIG. 2 shows a perspective sectional view of the fuselage of the arrangement by way of example according to FIG. 1.

In contrast to the approaches discussed in the introductory section, the installation of the line systems 2 is performed from outside the fuselage 3. For this purpose, the receiving regions 4 have openings 5 which are accessible from the outside during installation, as FIG. 2 shows in a perspective illustration. These openings 5 can be closed e.g. by first outer wall sections 6. These outer wall sections 6 may have the contour of the outer wall of the fuselage 3 in this region. They are designed in such a manner that they can absorb and pass on the forces occurring in these regions in the fuselage. For this purpose, they are releasably connected to the fuselage 3 by suitable fastening elements 8 (see FIG. 4), such as, for example, rivets and/or bolts.

FIG. 2 shows that the receiving regions 4 run, in particular, in the longitudinal direction of the fuselage 3 and communicate with further receiving regions 4' which are arranged at an angle, by way of example 90° in the present exemplary embodiment, thereto. Analogously, the receiving region 4' is closed in a pressure-tight manner with respect to the interior space 9 by means of separating devices 11, 12 and serves to receive components of the line system 2, as described further below with respect to FIG. 3.

The receiving region 4' analogously has at least one opening 5' which can be closed by a second outer wall section 7. The explanation provided above for the first outer wall section 6 more or less applies to said outer wall section 7 too.

The openings 5, 5' are advantageously designed in such a manner that the components and/or combinations of components of the line system 2 can be guided through them individually and/or in premanufactured constructional units, what are referred to as "routings". As a result, the particular advantage of separately manufacturing these routings is possible. After fitting has taken place, which fitting takes place exclusively or mainly from outside the fuselage 3, the outer wall sections 6, 7 are attached in order to close the openings 5, 5'. Since the receiving regions 4, 4' are not subjected to the internal pressure of the interior space 9, there is advantageously no need for a pressure-tight seal to seal the openings 5, 5', thus producing a saving on material and work.

Furthermore, because of the installation from outside the fuselage 3, its interior space 9 is not occupied by personnel assembling the line system 2, which would obstruct other work in the interior space 9 and would make special work and time divisions of the various work groups necessary. As a result, an advantageous time saving of up to 60% is obtained during the final assembly.

Figure 3:
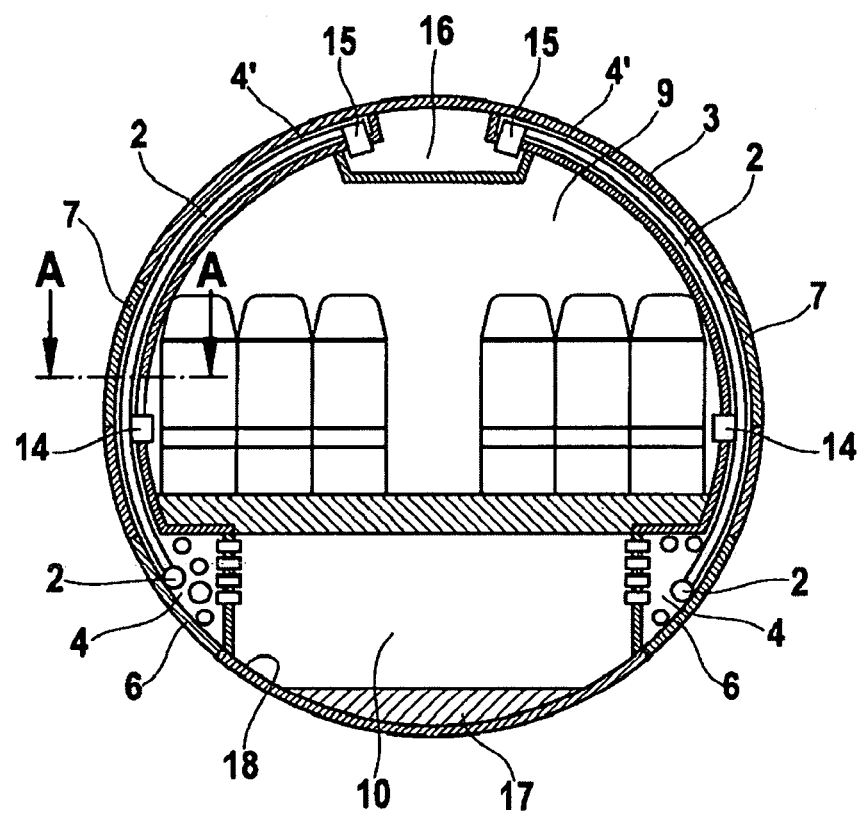
FIG. 3 shows a further cross-sectional view of the fuselage of the arrangement by way of example.

FIG. 3 illustrates a further cross-sectional view of the fuselage 3 of the arrangement 1 by way of example, after installation of the line system 2 has taken place and with division of the interior space into the first interior space 9 with seating for a passenger cabin and into a second interior space 10, situated below it, as the hold. According to the present exemplary embodiment, receiving regions 4 and 4' are arranged, for example, on both sides. The receiving regions 4' run on both sides upwards to the top region 16, the "crown area". In the region of the seating of the passenger cabin, second connecting devices 14 are provided in the separating devices 11, 12, as already explained above, for connection to corresponding devices, such as, for example, communication units, oxygen supply and the like. In the top region 16, third connecting devices 15 are arranged in the separating devices 11, 12 in order to permit connections to devices in this region. The openings of the receiving regions 4, 4' are, as already described above, closed by outer wall sections 6, 7 which, also in the present case, advantageously have the contour of the outer wall of the fuselage 3.

FIG. 4 shows a sectional view as per section line A-A according to FIG. 3. The fuselage 3 is only shown schematically by means of its wall. The reference number 19 indicates stiffening means which reinforce the fuselage 3.

In this example, the receiving region 4' is designed with a rectangular cross section, and the separating devices 11, 12 of said receiving region form the pressure-tight separating device with respect to the interior space 9. The receiving section 4, 4' is closed outwards, i.e. to the left in FIG. 4, by the outer wall section 7 which is attached to the fuselage 3 in particular by means of fastening elements 8. The fastening elements 8 are indicated only by their central lines. They can be designed, for example, as rivets or screws. The components of the line system only have to be checked at certain 8 maintenance intervals during which other outer wall sections for other devices are also to be opened, with said other outer wall sections being attached releasably in the same or a similar manner by fastening elements.

A large part of the installation of the line system 2 is therefore undertaken by separate premanufacturing at a location at which space conditions are not restricted, as a result of which certain work can be carried out with an additional time saving and also with more suitable tools than is the case in the narrow interior space 9.

By means of the installation from outside the fuselage 3, the interior space 9 is advantageously kept free for other end assembly work, as a result of which an advantageously more simple and rapid, i.e. more economical, sequence of work is obtained than in the prior art.

The invention is not restricted to the arrangement (illustrated in the figures) of a line system in an aircraft or spacecraft having a fuselage.

For example, it is conceivable that the receiving regions 4, 4' are arranged at other locations and in a greater or smaller number than in the examples shown. Their profile can also run at a modified angle with respect to the longitudinal direction of the fuselage 3.

By means of the arrangement of the receiving regions 4, 4' outside the impact region 17, the advantage of a lower probability of components of the line system 2 being damaged during a possible impact is also provided.

What is claimed is:

1. A line system arrangement in an aircraft or spacecraft having a fuselage, comprising at least a first receiving region and a second receiving region, wherein the first and second receiving regions each receive at least one component of a line system, wherein the component of the line system in at least one of the first and second receiving regions is a line for gaseous substances, wherein the receiving regions are accessible, at least in some sections, from outside the fuselage of the aircraft or spacecraft for at least one of installation and maintenance of the line system, and wherein the first and second receiving regions are adapted to an internal pressure which corresponds to a particular external pressure of the fuselage, wherein the arrangement comprises a pressure-tight separating device for pressure-tight separation of the first and second receiving regions from an interior space of the fuselage, and wherein the pressure-tight separating device comprises a connecting device for connecting the line for gaseous substances to a consumption unit and wherein the first receiving region is arranged along the length of the fuselage and wherein the second receiving region is arranged at an angle to the first receiving region along the circumference of the fuselage.

2. The arrangement according to claim 1, wherein at least the first receiving region extends along an inner wall of the fuselage in a longitudinal direction of the fuselage.

3. The arrangement according to claim 1, wherein at least the second receiving region extends along an inner wall of the fuselage at an angle to the longitudinal direction of the fuselage.

4. The arrangement according to claim 3, wherein at least the second receiving region extends along an inner wall of the fuselage in a direction perpendicular to the longitudinal direction of the fuselage.

5. The arrangement according to claim 1, wherein at least one of the first and second receiving regions is arranged outside an impact region of the fuselage.

6. The arrangement according to claim 1, wherein the line system further comprises at least one of an electric line, a line for liquid and a supporting element for the line system.

7. The arrangement according to claim 6, wherein the pressure-tight separating device comprises a connecting device for connecting the electric line to a power supply unit.

8. The arrangement according to claim 6, wherein the pressure-tight separating device comprises a connecting device for connecting the line for liquid to a consumption unit.

9. The arrangement according to claim 1, wherein at least one of the first and second receiving regions comprises a closable opening serving as an access region.

10. The arrangement according to claim 9, wherein the closable opening of the at least one of the first and second receiving regions can be closed by at least one removable outer wall section.

11. The arrangement according to claim 10, wherein the at least one removable outer wall section is designed to at least one of absorb and pass on forces occurring in the fuselage.

12. The arrangement according to claim 10, wherein the at least one removable outer wall section is attached releasably to the at least one of the first and second receiving regions by means of fastening elements.

13. The arrangement according to claim 9, wherein the removable outer wall section is designed as a section of an outer wall of the fuselage with a contour matched to said outer wall.

14. The arrangement according to claim 9, wherein the line system is designed as a premanufactured subassembly in such a manner that the line system can be placed into the at least one of the first and second receiving regions via the closable opening.

15. An aircraft or spacecraft with a line system arrangement according to claim 1.

16. The arrangement according to claim 1, wherein the line for gaseous substances is an oxygen line and the pressure-tight separating device comprises the connecting device for connecting the oxygen line to an oxygen supply.

* * * * *